(No Model.) 4 Sheets—Sheet 2.
C. LINDBERG.
ELECTRIC MOTOR.
No. 585,527. Patented June 29, 1897.
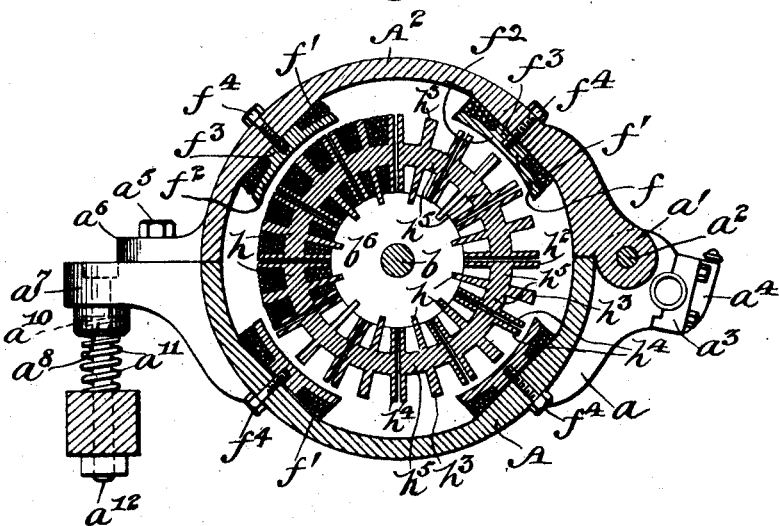
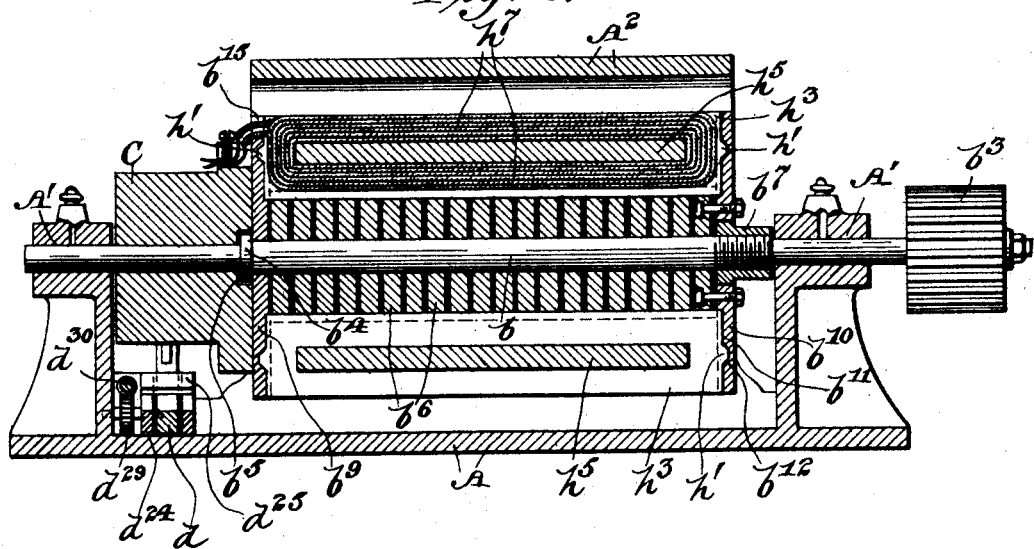
WITNESSES
INVENTOR
Charles Lindberg
by his atty
Mason, Fenwick & Lawrence (No Model.)  4 Sheets—Sheet 3.
C. LINDBERG.
ELECTRIC MOTOR.
No. 585,527.  Patented June 29, 1897.
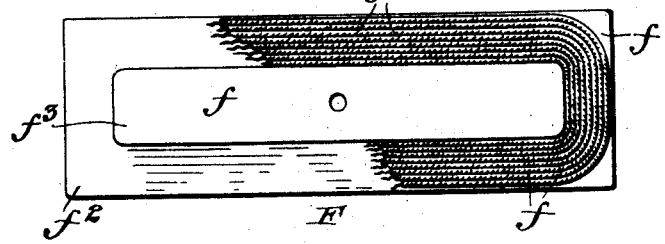
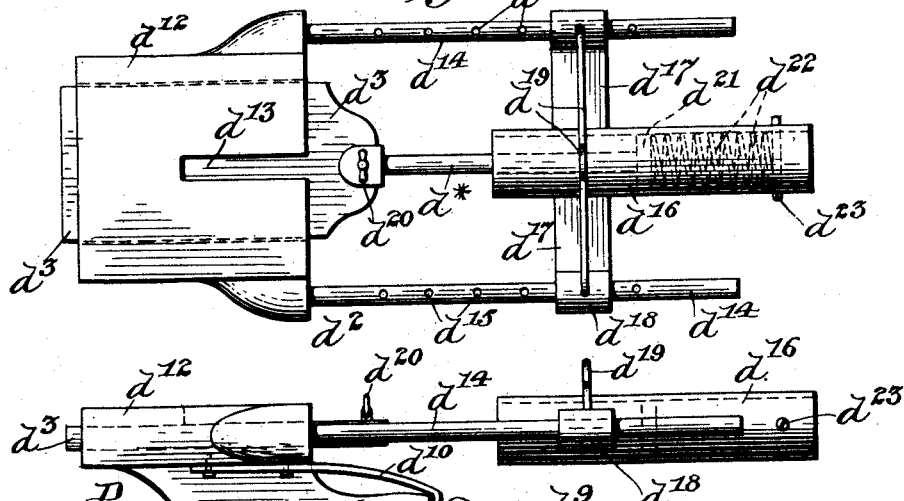
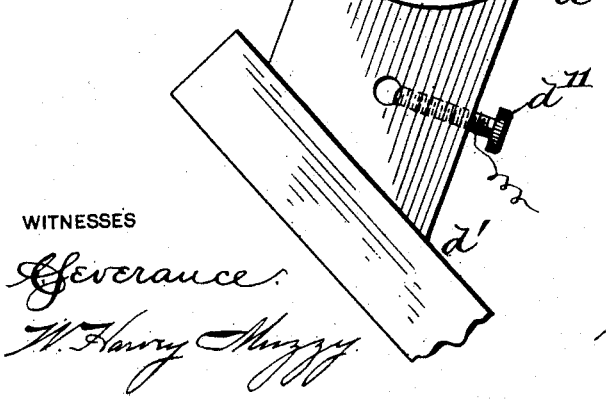
WITNESSES  INVENTOR (No Model.) 4 Sheets—Sheet 4.
C. LINDBERG.
ELECTRIC MOTOR.
No. 585,527. Patented June 29, 1897.
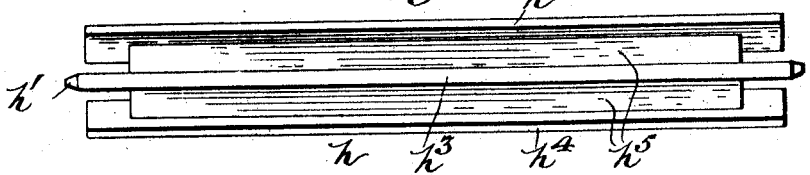
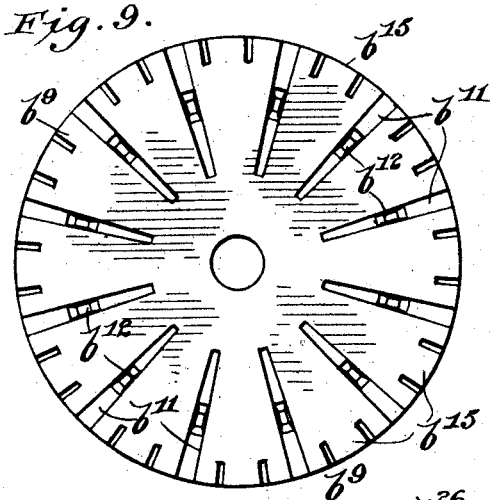
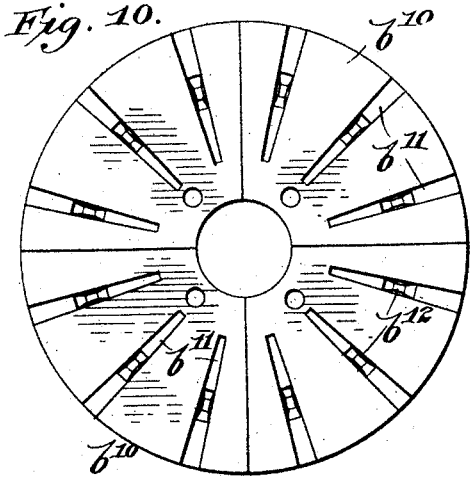
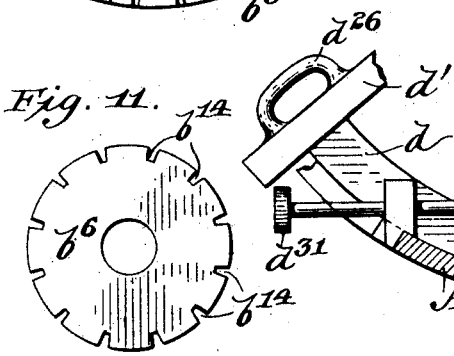
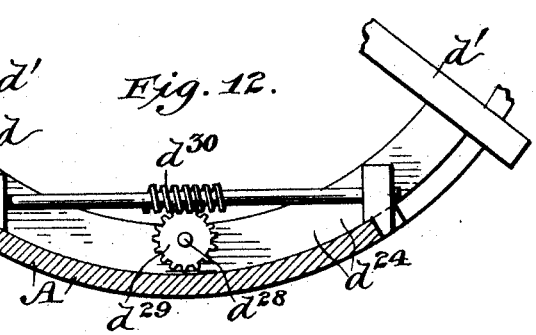
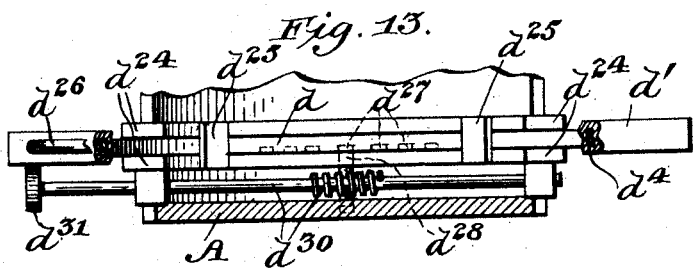
WITNESSES
INVENTOR
Charles Lindberg
by his attys
Mason, Fenwick & Lawrence

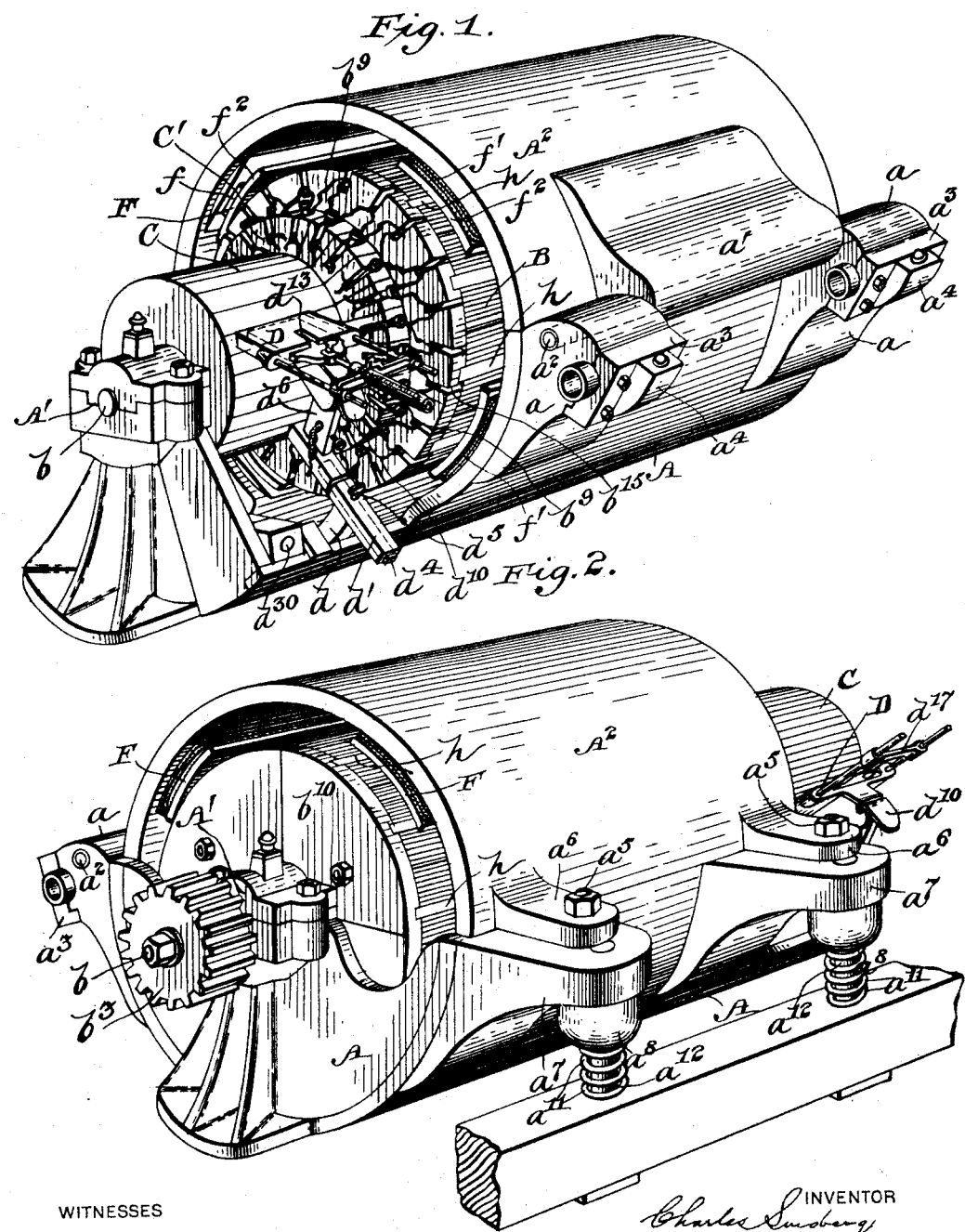

UNITED STATES PATENT OFFICE.

CHARLES LINDBERG, OF DULUTH, MINNESOTA.

ELECTRIC MOTOR.

SPECIFICATION forming part of Letters Patent No. 585,527, dated June 29, 1897.

Application filed February 24, 1896. Serial No. 580,603. (No model.)

*To all whom it may concern:*

Be it known that I, CHARLES LINDBERG, a citizen of the United States, residing at Duluth, in the county of St. Louis and State of Minnesota, have invented certain new and useful Improvements in Electric Motors; and I do hereby declare the following to be a full, clear, and exact description of the invention, such as will enable others skilled in the art to which it appertains to make and use the same.

My invention relates to improvements in electric motors, and is intended more particularly for adoption in motors designed for the propulsion of cars, carriages, and other vehicles.

The invention consists of certain novel constructions, combinations, and arrangements of parts, all of which will be hereinafter more particularly set forth and claimed.

In the accompanying drawings, forming part of this specification, Figure 1 represents a perspective view of a motor embodying my invention. Fig. 2 represents a similar view taken on the opposite side and end. Fig. 3 represents a central vertical transverse section through the same. Fig. 4 represents a central vertical longitudinal section through said motor. Fig. 5 represents a top plan view of one of the removable field-magnets, showing the coil partly broken away. Fig. 6 represents an enlarged detail top plan view of the commutator-brush and support. Fig. 7 represents a side elevation of the same. Fig. 8 represents an enlarged detail top plan view of one of the removable armature-pieces before winding. Fig. 9 represents an enlarged detail elevation of the inner face of the forward armature-plate. Fig. 10 represents a similar view of the rear plate. Fig. 11 represents a detail side elevation of one of the disks of which the armature-core is composed. Fig. 12 represents a detail side elevation of the devices for supporting and adjusting the yoke carrying the commutator-brushes, and Fig. 13 represents a top plan view of the same.

A in the drawings represents the frame; A' and A', the journal-boxes at each end of the same; $A^2$, the hinged top of the frame; B, the armature; C, the commutator, and D D the commutator-brushes.

The frame A is semicylindrical in form and is provided near one of its upper edges with projecting lugs $a\ a$, that form one member of the hinge that secures the two parts of the frame together. The other member of the hinge comprises a lug $a'$, formed on one of the lower edges of the semicircular top $A^2$ and adapted to fit between the lugs $a\ a$, a transverse pin $a^2$ passing through all of said lugs and securing them movably together. Removable bearing-blocks $a^3$ are secured to the outer faces of the lugs $a\ a$ and form bearings in which the axle of the car or vehicle is journaled. These bearing-boxes are provided with suitable oil-boxes $a^4$, by which the axle may be lubricated.

The top $A^2$ is held down firmly in position by bolts $a^5$, that pass through lugs $a^6$, formed on the free edge of the said top, and into lugs or projections $a^7\ a^7$, formed on the base A. These latter lugs are provided with pendent studs $a^8\ a^8$, that are provided with circular sockets $a^{10}$, that receive the upper ends of coil-springs $a^{11}$. These springs rest upon a cross-bar of the truck and are secured in position by bolts $a^{12}$, that pass vertically through projections $a^7$, studs $a^8$, said springs, and the cross-bar, suitable nuts being provided on the lower ends of said bolts and adapted to be seated in suitable sockets in the car-truck and thus support this side of the frame. When the top is secured on the frame, as above described, a cylindrical frame is formed for the reception of the armature.

The removable field-magnets F are each composed of a core $f$ and a coil $f'$. The core comprises a segmental plate $f^2$, having a longitudinal projection $f^3$, the wire $f^7$ being wound about said projection in the usual manner for winding field-magnets. Each magnet is removably secured by a bolt $f^4$, that passes through the top $A^2$ or the frame A, as the case may be.

It will be observed from the above that it is the work of a minute to remove and insert a magnet.

The armature B comprises a shaft $b$, journaled in the boxes A' A', core-rings $b^6$, and magnets hereinafter described. The shaft $b$ is provided at one end with a gear-wheel $b^3$, that imparts motion to the axle of the car through suitable intermediate gearing. (Not shown.) The commutator C is rigidly mounted upon the said shaft $b$ and is constructed in any ordinary and usual manner. The said shaft $b$ is also provided with an annular enlargement $b^4$, which fits into a recess $b^5$, formed in the inner face of the commutator.

The armature-plate $b^9$ (shown in Fig. 9) is next applied about the shaft. The core-rings $b^6$ are next applied on said shaft with suitable washers of paper or like insulating material between them. After a sufficient number of washers have been built upon the shaft to form the core they are bound tightly together by a nut $b^7$, that engages screw-threads $b^8$, cut about the shaft. The forward armature-plate $b^9$ is solid and the rear armature-plate $b^{10}$, which is applied on the shaft over the nut $b^7$, is formed in a number of sections, so that it may be readily removed from about the shaft. The two armature-plates are provided with shallow radial grooves $b^{11}$, adapted to receive the ends of the armature-magnet cores $h$. Apertures $b^{12}$ are formed in said plates outward from the bottom of each groove to receive the extended ends $h'$ of said cores $h$. Each of these cores $h$ comprises three vertical webs $h^2$, $h^3$, and $h^4$, spaced and connected by a central horizontal web $h^5$. The said vertical webs converge toward one edge, so that when applied about the armature-core they will each be in a direct radial line from the center of the core. The middle web $h^3$ extends beyond the two side webs both at the ends and at the bottom, the extended ends fitting into the radial grooves of the end plates of the armature and the extended bottom edge fitting into coinciding slots $b^{14}$, cut in the peripheries of the washers $b^6$. Each of the cores $h$ is wound on each side of the middle web with a coil $h^7$, said coils having their ends secured in slots in the proper commutator-sections by suitable screws, after passing through suitable radial slots $b^{15}$, cut in the periphery of the forward end plate of the armature.

The flange C' of the commutator contains as many slots as the front plate of the armature—that is to say, each commutator-segment has a slot in its flange. These slots are cut the entire width of the flange, but not the full depth of the same, and each slot is threaded to receive a suitable wire-retaining post or screw. Supposing now each of the coils of the armature to be numbered consecutively and the slots in the front armature-plate and the slots in the commutator-flange to be also consecutively numbered, one end of the first coil would be laid in slot No. 1 of the commutator-flange and would lead through slot 1 of the front armature-plate, pass the requisite number of times around the armature-magnet cores, thus forming the coil, and the other end of the wire would lead back through slot 1 of the front plate and cross over and be secured in slot No. 2 of the commutator-flange. Wire No. 2 would start from slot 2 of commutator-flange, pass through slot 2 in front plate, form coil 2 of armature, lead back through slot 2 of armature front plate, cross over and terminate and be secured in slot 3 of commutator-flange, and so on around the armature. The whole machine is "connected up in series" in the usual style.

The commutator-brushes D D are mounted upon the respective ends of an adjustable yoke $d$ on the opposite sides of the commutator, and each comprises a supporting-standard $d'$, connected to one end of the yoke, a frame $d^2$, adjustably mounted on said standard, and a spring-pressed contacting piece $d^3$. The lower portion of each standard $d'$ is divided into two sections connected together, but out of electrical contact with each other, by an insulating-core $d^4$. This core is adjustably mounted in one of the sections of the standard and secured therein by a thumb-screw $d^5$. The upper section of each standard is provided with an upwardly-projecting plate $d^6$, ears $d^7$ of the frame $d^2$ being secured on opposite sides of the upper end of the same by a suitable pivot-pin passed therethrough. The top of said plate $d^6$ and said ears $d^7$ are each provided with a notch $d^8$ and $d^9$ $d^9$, respectively. A spring $d^{10}$, mounted on the frame $d^2$, is adapted to engage said notches $d^8$ and $d^9$ when in a coinciding position and thus hold them so, the frame $d^2$ when in this position holding the brush against the commutator. When so desired, the frame may be swung up and back so as to disengage the brush from the commutator by forcing the spring out of the coinciding notches and revolving the frame on the pivot. The circuit-wire is connected to the plate $d^6$ by a screw $d^{11}$. Said frame $d^2$ comprises a hollow plate $d^{12}$, having a longitudinal slot $d^{13}$ in its upper side and two rearwardly-projecting guide-arms $d^{14}$, the latter being provided along their upper faces with recesses $d^{15}$. The hollow cylindrical spring-carrying frame $d^{16}$ is adjustably mounted on these guide-arms by means of laterally-projecting arms $d^{17}$, having apertured heads $d^{18}$, through which said guide-arms pass. An adjusting-spring $d^{19}$ is mounted on said frame $d^{16}$, and has its free ends turned downward at right angles and projecting through vertical apertures cut in the heads $d^{18}$, so as to engage the recesses $d^{15}$ and hold the frame $d^{16}$ firmly in any adjusted position. The contacting pieces $d^3$ are adapted to slide in the hollow frames $d^{12}$ and are each provided at the rear end with a projecting stem or piston-rod $d^\times$, removably secured thereto by a thumb-screw $d^{20}$. The free end of each of these rods is provided with a piston $d^{21}$, said pistons working in the cylindrical frames $d^{16}$ and being forced forward to cause the contacting pieces to always engage the commutator with a yielding pressure by spiral springs $d^{22}$ in said cylindrical frames behind said pistons. The slots in the upper sides of the frames $d^{12}$ accommodate the movements of the thumb-screws $d^{20}$. The rear ends of the spiral springs are secured in their respective cylindrical frames at the rear by split pins $d^{23}$, that pass laterally through said frames.

It will be observed from the above that the contacting pieces can be adjusted to contact with the commutator with any degree of pressure required by means of the adjustability of the spring-carrying cylindrical frames. The brushes can also be thrown back away from the commutator instantly by means of the pivoted connection of the frame $d^2$ with the supporting-plate.

The yoke $d$ is mounted between guides $d^{24}$ on the frame A and connected by binders $d^{25}$, and is adapted to be rocked in said guides by a handle $d^{26}$, mounted on one of the brush-supporting standards. The yoke is provided along one of its sides with recesses $d^{27}$, and is adapted to be locked in any of its adjusted positions by a screw-bolt $d^{28}$, that passes through one of said guides $d^{24}$ and engages any one of the recesses $d^{27}$, according to the position of the yoke. This bolt is moved in and out by a worm-wheel $d^{29}$, fast thereon. This wheel is in turn operated by a worm-shaft $d^{30}$, journaled in the frame A and provided at one end with a milled wheel $d^{31}$, by which it is rotated.

It will be observed from the above that the positions of the brushes may be changed in regard to their engagement with the commutator, but that they always remain in the same relative position to each other as the yoke carrying them is shifted bodily.

I deem it of great importance that with my invention all the parts are removable for repairs, and should a coil burn out or any part become broken or otherwise injured it can be instantly replaced independently of the other parts.

The magnets of the armature should be of equal capacity and contain an equal amount of wire in each. The disks forming the armature-core and also the front plate and the commutator-drum are all keyed on the shaft by any suitable means.

By modifying the frame and the gear-wheel and reversing the process of communicating the power the herein-described constructions are substantially applicable to dynamos.

Strips of wood or other suitable substance are preferably secured to the front edge of the motor-frame cylinder for insulating purposes and to protect the wire insulation from abrasion. Suitable grooves are cut in the same, and the wires connecting the field-magnets are secured to said wooden strips in said grooves and protected by coverings of metal or wooden strips secured to the face of said first-mentioned strips.

Having now described my invention, what I claim as new, and desire to secure by Letters Patent, is—

1. In an electric motor or dynamo the combination with a frame provided with field-magnets, of an armature within said frame comprising a core provided with grooves in its periphery and independently-removable magnets arranged about the same each of said magnets consisting of three approximately-vertical webs connected by an approximately-horizontal web so as to form a double diverging spool, one of said vertical webs being deeper than the others for engaging the said grooves in the armature, to assist in holding said magnets in proper place, substantially as described.

2. In an electric motor or dynamo the combination of a suitable frame, field-magnets mounted thereon, an armature mounted in said frame and comprising a shaft, insulated disks mounted thereon and grooved at their peripheries to form longitudinal channels by a coincidence of said grooves and independently-removable magnets having cores formed with a projecting longitudinal ridge adapted to take into the longitudinal channels of the core, substantially as described.

3. In an electric motor or dynamo, a commutator-brush comprising a brush proper and a support having a notched disk, a supporting-standard having a notched disk at is upper end on which is pivoted the first-mentioned disk, a spring on the brush-casing having a projection adapted to engage the said notches on the disks when they coincide and thus hold the brush in its operative position but allow it to be thrown up out of the way, at will.

4. In an electric motor or dynamo, the combination of a suitable frame, field-magnets mounted on the same, an armature comprising a core, a series of independently-removable coils wound on separate cores, a solid front end plate provided with radial grooves in which the forward ends of said cores are seated, a rear end plate formed in sections which are secured to the core, and a nut mounted on the shaft for forcing all of the parts mounted thereon firmly together, substantially as described.

In testimony whereof I hereunto affix my signature in presence of two witnesses.

CHARLES LINDBERG.

Witnesses:
JAMES T. WATSON,
F. E. EBNER.